United States Patent
Niki

(10) Patent No.: US 11,190,029 B2
(45) Date of Patent: Nov. 30, 2021

(54) METHODS AND APPARATUS FOR A BATTERY

(71) Applicant: SEMICONDUCTOR COMPONENTS INDUSTRIES, LLC, Phoenix, AZ (US)

(72) Inventor: Mutsuki Niki, Saitama (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 406 days.

(21) Appl. No.: 16/455,244

(22) Filed: Jun. 27, 2019

(65) Prior Publication Data

US 2020/0366105 A1  Nov. 19, 2020

Related U.S. Application Data

(60) Provisional application No. 62/848,203, filed on May 15, 2019.

(51) Int. Cl.
*H02J 7/00* (2006.01)
*H01M 10/42* (2006.01)
*H01M 10/44* (2006.01)

(52) U.S. Cl.
CPC ....... *H02J 7/0029* (2013.01); *H01M 10/4257* (2013.01); *H01M 10/44* (2013.01); *H02J 7/0063* (2013.01); *H01M 2010/4271* (2013.01); *H01M 2220/30* (2013.01); *H02J 2007/0067* (2013.01)

(58) Field of Classification Search
CPC .................. H02J 7/0029; H02J 7/0063; H02J 2007/0067; H01M 10/4257; H01M 10/44; H01M 2010/4271; H01M 2220/30
USPC ......................................................... 320/135
See application file for complete search history.

(56) References Cited

U.S. PATENT DOCUMENTS

| | | | |
|---|---|---|---|
| 2010/0194348 A1 | 8/2010 | Wang | |
| 2013/0229145 A1 | 9/2013 | Alessandro | |
| 2016/0344205 A1* | 11/2016 | Abe | ........ H02J 7/0031 |
| 2020/0036211 A1* | 1/2020 | Miyazaki | .......... H02J 7/06 |

* cited by examiner

*Primary Examiner* — Nathaniel R Pelton
(74) *Attorney, Agent, or Firm* — Noblitt & Newson, PLLC

(57) ABSTRACT

Various embodiments of the present technology may provide methods and apparatus for a battery. The apparatus may enable/disable a protection circuit to prevent current leakage and discharging of the battery. The apparatus may comprise a control switch to enable/disable the protection circuit without an external power supply.

20 Claims, 2 Drawing Sheets

METHODS AND APPARATUS FOR A BATTERY

CROSS-REFERENCE TO RELATED APPLICATIONS

Figure 1:
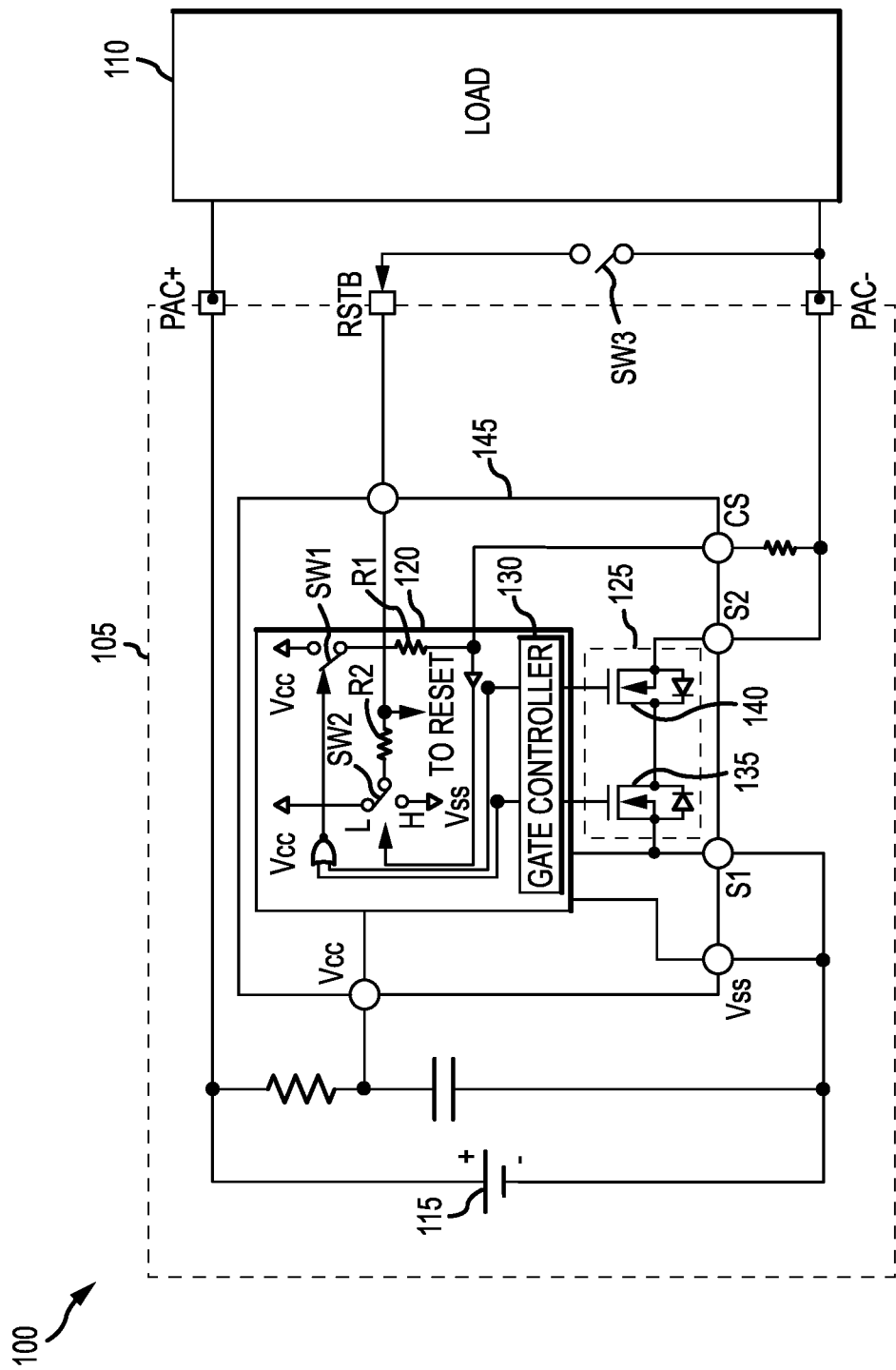

This application claims the benefit of U.S. Provisional Patent Application No. 62/848,203, filed on May 15, 2019, the entire contents of which is incorporated herein by reference.

BACKGROUND OF THE TECHNOLOGY

Many battery-powered mobile devices are assembled with a battery that cannot be easily removed or disconnected from the mobile device. In some cases, the mobile device is not in use immediately after assembly. For example, the mobile device may be shipped to a consumer or retailer. During the time when the mobile device is not in use, the battery may discharge due to current leakage and may discharge completely (i.e., the battery has no charge left). A state of complete discharge may affect the performance of the battery and cause premature deterioration of the battery. A conventional method for preventing current leakage includes activating a "shipping mode" immediately after assembly. However, the conventional method requires that the mobile device be connected to an external power supply (e.g., an AC power source) in order to exit the "shipping mode" and return to a "normal mode" for use by a consumer.

SUMMARY OF THE INVENTION

Various embodiments of the present technology may provide methods and apparatus for a battery. The apparatus may enable/disable a protection circuit to prevent current leakage and discharging of the battery. The apparatus may comprise a control switch to enable/disable the protection circuit without an external power supply.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Figure 2:
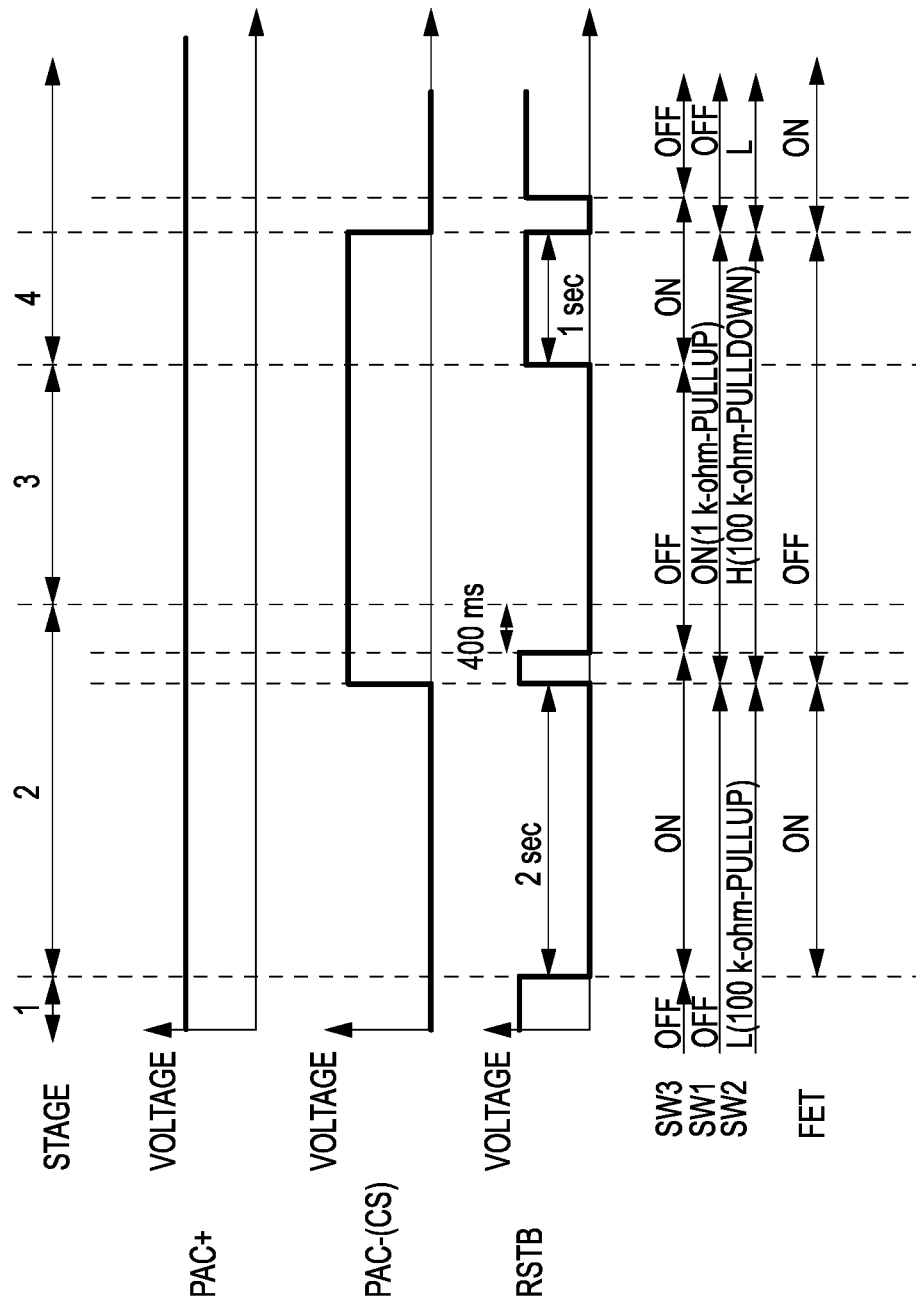

FIG. 1 representatively illustrates a system in accordance with an exemplary embodiment of the present technology; and FIG. 2 is a timing diagram of the system in accordance with an exemplary embodiment of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various controllers, amplifiers, signal converters, drivers, switching devices, current sources, voltage sources, logic gates, semiconductor devices, such as transistors, capacitors, and the like, which may carry out a variety of functions. In addition, the present technology may be integrated in any number of electronic systems, such as automotive, aviation, "smart devices," portables, and consumer electronics, and the systems described are merely exemplary applications for the technology.

Referring to FIG. 1, an exemplary system 100 may be integrated in a battery-powered mobile device (not shown), such as a cell phone, laptop computer, and the like. For example, the system 100 may comprise a battery pack 105 and a load 110, such as a processing circuit.

The battery pack 105 may provide power to the load 110 and/or other elements of the mobile device. For example, the battery pack 105 may comprise a battery 115 to store charge. The battery 115 may comprise a rechargeable battery, such as such as a lithium-ion, lead-acid, nickel-cadmium, nickel-metal hydride, and the like.

The battery pack 105 may further comprise a plurality of terminals. In an exemplary embodiment, the battery pack 105 may comprise a first terminal (e.g., a positive terminal, PAC+), a second terminal (e.g., a negative terminal, PAC−), and a third terminal (e.g., a control terminal, RSTB). In an exemplary embodiment, the battery pack 105 may be connected to the load 110 via the plurality of terminals.

According to an exemplary embodiment, the battery pack 105 may further comprise an integrated circuit 145 configured to control charging and discharging operations of the battery 115. The integrated circuit 145 may also be used to prevent charge surges to the load 110 during normal use. In addition, the integrated circuit 145 may be set to a desired mode, such as a "shipping mode" and a "normal mode." In general, the integrated circuit 145 is OFF during the "shipping mode." In an exemplary embodiment, the integrated circuit 145 may comprise a control circuit 120 and a protection circuit 125.

According to an exemplary embodiment, the integrated circuit 145 may be connected to the positive and negative terminals PAC+, PAC− of the battery pack 105 and the battery 115 to monitor a voltage of the battery 115 and/or a current of the battery 115. The integrated circuit 145 may also be connected to the control terminal RSTB.

According to an exemplary embodiment, the integrated circuit 145 may also be connected to and operate according to a first supply voltage Vcc and a second supply voltage Vss.

In an exemplary embodiment, the protection circuit 125 and the control circuit 120 may operate together to monitor and/or restrict the current flow from the battery 115 to the load 110 during normal use of the mobile device. For example, if the values of such variables exceed a predetermined maximum threshold, then the integrated circuit 145 may stop or reduce the current flow from the battery 105 to the load 110.

In various embodiments, the integrated circuit 145 may respond to a signal from the control terminal RSTB. For example, functionality of the integrated circuit 145 may be enabled or disabled according to the signal from the control terminal RSTB. A disabled functionality may correspond to the "shipping mode" (i.e., a "standby mode"), while an enabled functionality may correspond to the "normal mode."

The protection circuit 125 may be adapted to control charging and discharging of the battery 115. For example, the protection circuit 125 may comprise a plurality of transistors, such as a first FET 135 (e.g., a charge FET (field effect transistor)) and a second FET 140 (e.g., a discharge FET). Each FET 135, 140 may comprise a gate terminal, a source terminal, and a drain terminal. According to an exemplary embodiment, the protection circuit 125 may be directly connected to the negative terminal PAC− of the battery pack 105. The protection circuit 125 may also be connected to the control circuit 120.

The control circuit 120 may be adapted to operate and/or detect operation of the first and second FETs 135, 140. For example, the control circuit 120 may comprise a control sub-circuit 130 to apply a voltage to the gate terminals of the first and second FETs 135, 140. Accordingly, the control sub-circuit 130 may be directly connected to the gate terminals of the first and second FETs 135, 140. The control sub-circuit 130 may comprise a logic circuit and/or other suitable circuit.

According to an exemplary embodiment, the control circuit 120 may further comprise a first switch SW1 and a second SW2. The first and second switches SW1, SW2 may be selectively operated in conjunction with the first and second FETs 135, 140 to enable/disable functionality of the integrated circuit 145.

According to an exemplary embodiment, the first switch SW1 may be responsive to the control sub-circuit 130. For example, the first switch SW1 may be configured to connect/disconnect from the first supply voltage Vcc according to a signal from the control sub-circuit 130.

The control circuit 120 may further comprise a first resistor R1 connected between the first switch SW1 and the negative terminal PAC−. The first resistor R1 may comprise a conventional resistor having any suitable resistance. In an exemplary embodiment, the first resistor R1 may have a resistance of 1 k-ohm.

The second switch SW2 may be responsive to a voltage potential of the negative terminal PAC−. For example, the second switch SW2 may selectively connect to the first supply voltage Vcc and the second supply voltage Vss according to the voltage potential of the negative terminal PAC−.

The control circuit 120 may further comprise a second resistor R2 connected between the second switch SW2 and the control terminal. The second resistor R2 may comprise a conventional resistor having any suitable resistance. In an exemplary embodiment, the second resistor R2 may have a resistance of 100 k-ohm.

According to an exemplary embodiment, the system 100 may further comprise a third switch SW3. The third switch SW3 may comprise a conventional mechanical switch adapted for manual operation. For example, the third switch SW3 may be accessible (to a user) by using a special tool to turn the third switch SW3 ON and OFF. The third switch SW3 may be connected between the negative terminal PAC− and the control terminal RSTB.

The third switch SW3 may be formed in any desirable location. For example, the third switch SW3 may be formed within the battery pack 105. Alternatively, the third switch SW3 may be formed outside of the battery pack 105.

Referring to FIGS. 1 and 2, in operation, activation/deactivation of the third switch SW3 turns the protection circuit 125 ON and OFF and allows the battery pack 105 to enter the "standby mode," wherein the battery pack 105 is OFF to prevent current leakage and/or discharging of the battery 115. According to an exemplary embodiment, turning ON/OFF the protection circuit 125 does not require an external power supply (e.g., AC power source). In other words, the mobile device is free of a connection to an external power supply when switching from the "standby mode" to the "normal mode."

According to an exemplary operation, the battery pack 105 may be described by a set of starting conditions, such as 1) the third switch SW3 is in an OFF position; 2) the first switch is disconnected from the first supply voltage Vcc; and 3) the second switch is connected to the first supply voltage Vcc. The set of starting conditions may be referred to collectively as a first stage and may be present during a manufacturing process of the electronic device.

During a second stage, the third switch SW3 is turned ON (e.g., manually by the user) to connect the negative terminal PAC− of the battery pack 105 to the control terminal RSTB. The third switch SW3 may be turned ON for a specified duration of time, such as two seconds. Turning ON the third switch SW3 also has the effect of turning OFF the first and second FETs 135, 140. The control sub-circuit 130 may detect that the first and second FETs 135, 140 are OFF and generate a signal to connect the first switch SW1 to the first supply voltage Vcc. This action reverses a polarity of the control terminal RSTB and causes a voltage of the negative terminal PAC− to be pulled-up (goes high) and connects the second switch SW2 to the second supply voltage Vss. When the voltage of the negative terminal PAC− is pulled-up, the voltage may be equal to that of the positive terminal PAC+. The third switch SW3 is then turned OFF again (e.g., manually by the user). Accordingly, at the end of the second stage, the third switch SW3 is OFF, the first and second FETs are OFF, the negative and positive terminals PAC−, PAC+ are at the same voltage potential, and the polarity of the control terminal RSTB is opposite from that of the first stage.

During a third stage (i.e., the "standby mode"), the conditions of the system 100 remain the same as they were at the end of the second stage. Specifically, the third switch SW3 is OFF, the first and second FETs are OFF, the negative and positive terminals PAC−, PAC+ are at the same voltage potential, and the polarity of the control terminal RSTB is opposite that from of the first stage. Accordingly, during the third stage, since the first and second FETs 135, 140 are OFF, current cannot leak from the battery 115 and/or the battery 115 is unable to discharge, thus maintaining an initial charge.

During a fourth stage, the system 100 may transition out of the "standby mode" and into the "normal mode" (e.g., a regular operating state). For example, the third switch SW3 is turned ON again (e.g., manually by the user) for a duration of time, for example one second, and then turned OFF again. This action reverses the polarity of the control terminal RSTB a second time, causing the voltage of the negative terminal PAC− to be pulled-down (goes low), and connects the second switch SW2 to the first supply voltage Vcc (SW2=L). Once the polarity of the control terminal RSTB is reversed, the first and second FETs respond by turning ON. The control sub-circuit 130 may then detect that the first and second FETs are ON and generate a signal to disconnect the first switch SW1 from the first supply voltage Vcc (SW1=OFF).

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A circuit adapted to control a battery, comprising:
a plurality of connection terminals, comprising:
a positive terminal;
a negative terminal; and
a control terminal;
a protection circuit connected between the battery and the negative terminal and configured to control electric discharge of the battery;
a control circuit connected to the protection circuit and comprising:
a first switch connected to the negative terminal; and
a second switch connected to the control terminal; and
a third switch connected between the control terminal and the negative terminal.

2. The circuit according to claim 1, wherein the control circuit further comprises a resistor connected between the first switch and the negative terminal.

3. The circuit according to claim 1, wherein the first switch selectively connects the negative terminal to a supply voltage.

4. The circuit according to claim 1, wherein the second switch selectively connects the control terminal to a first supply voltage and a second supply voltage.

5. The circuit according to claim 1, wherein the control circuit further comprises a resistor connected between the second switch and the control terminal.

6. The circuit according to claim 1, wherein the third switch comprises a mechanical switch adapted for manual operation.

7. The circuit according to claim 1, wherein the protection circuit comprises a first field-effect transistor and a second field effect transistor.

8. The circuit according to claim 1, wherein the control circuit further comprises a control sub-circuit adapted to:
detect operation of the protection circuit; and
operate the first and second switches.

9. A method for controlling discharging of a battery in a battery pack and integrated within an electronic device, wherein the electronic device is free of a connection to an external power supply, comprising:
during a first stage, comprising starting conditions of:
an external switch in an OFF position;
a first switch disconnected from a first supply voltage; and
a second switch connected to the first supply voltage;
during a second stage:
turning ON the external switch to connect a negative terminal of the battery pack to a control terminal of battery pack for a first time period;
turning OFF a first transistor and a second transistor;
increasing a voltage potential of a negative terminal of the battery pack to be equal to a voltage potential of a positive terminal of the battery pack, wherein the negative terminal is connected to the first switch; and
inverting a polarity of a control terminal, wherein the control terminal is connected to the external switch and the second switch; and
entering a third stage, wherein the first and second transistors are OFF.

10. The method according to claim 9, further comprising turning OFF the external switch at a time after the first time period has ended.

11. The method according to claim 9, wherein increasing the voltage potential of the negative terminal to be equal to the voltage potential of the positive terminal comprises:
connecting the first internal switch to the first supply voltage; and
connecting the control terminal to a second supply voltage using a second internal switch.

12. The method according to claim 9, further comprising, during a fourth stage:
turning ON the external switch for a second time period; and
increasing a voltage potential of the control terminal.

13. The method according to claim 12, wherein the first time period is approximately two seconds and the second time period is approximately one second.

14. The method according to claim 12, wherein the fourth stage further comprises:
disconnecting the first internal switch from the first supply voltage;
connecting the second internal switch to the second supply voltage;
turning ON the first and second transistors; and
turning OFF the external switch.

15. A system capable of connecting to a load, comprising:
a battery pack comprising:
- a battery;
- a first pack terminal;
- a second pack terminal;
- a third pack terminal; and
- an integrated circuit connected to:
  - the battery;
  - the first pack terminal; and
  - the second pack terminal;
  - wherein the integrated circuit comprises:
    - a protection circuit comprising a transistor; and
    - a control circuit connected to the protection circuit and comprising:
      - a first switch connected to the second pack terminal; and
      - a second switch connected to the third pack terminal; and
      - a third switch connected between the second and third terminals and adapted to connect the load to the third terminal.

16. The system according to claim 15, wherein the third switch comprises a mechanical switch adapted for manual operation.

17. The system according to claim 15, wherein the control circuit further comprises a resistor connected between the first switch and the second pack terminal.

18. The system according to claim 15, wherein the first switch selectively connects the third pack terminal to a positive-voltage supply.

19. The system according to claim 15, wherein the second switch selectively connects the third pack terminal to a first supply voltage and a second supply voltage.

20. The system according to claim 15, wherein the control circuit further comprises a resistor connected between the second switch and the third pack terminal.

* * * * *